United States Patent [19]

Shimizu et al.

[11] Patent Number: 5,158,263

[45] Date of Patent: Oct. 27, 1992

[54] FLOW RATE CONTROL VALVE

[75] Inventors: Tetsuo Shimizu; Michinori Iwamoto, both of Kyoto, Japan

[73] Assignee: Stec, Inc., Kyoto, Japan

[21] Appl. No.: 784,600

[22] Filed: Oct. 30, 1991

[51] Int. Cl.$^5$ .............................................. F16K 31/06
[52] U.S. Cl. .............................. 251/129.21; 251/129.17
[58] Field of Search ........................ 251/129.21, 129.17

[56] References Cited

U.S. PATENT DOCUMENTS 4,653,525 3/1987 Young ...................... 251/129.21 X
4,969,629 11/1990 Athanassiu .................. 251/129.21 X

FOREIGN PATENT DOCUMENTS 2094946 9/1982 United Kingdom ........... 251/129.21

*Primary Examiner*—Arnold Rosenthal
*Attorney, Agent, or Firm*—Price, Gess & Ubell

[57] ABSTRACT

In a flow rate control valve comprising a fixed core made of a magnetic material provided with a coil arranged on a circumference thereof, a movable core and a valve body made of a magnetic material moved by an attraction by a magnetic force of said fixed core or a release from said magnetic force to open and close a valve seat and a movable member composed of a supporting spring, the fixed core is provided with a flowing conduit passing through an opening formed in a surface opposite to said movable member and the movable member is provided with a passage guiding a fluid, so that the total quantity of fluid can be smoothly flown without staying a part of the fluid.

4 Claims, 3 Drawing Sheets

FLOW RATE CONTROL VALVE

BACKGROUND OF THE INVENTION

1. Field of the Invention

The present invention relates to a control valve controlling a flow rate of fluid such as gas or liquid.

2. Description of the Prior Art

A control valve the of normal close type shown in for example FIG. 6 has been known as a control valve for controlling a flow rate of fluid such as gas and liquid.

Referring to FIG. 6, reference numeral 31 designates a passage block and reference numeral 32 designates a flowing-in conduit formed in said passage block 31. Said flowing-in conduit 32 is closed by a partition wall 33 at an end portion thereof and a flowing-out conduit 34 is formed through said partition wall 33. Reference numeral 35 designates a valve chamber formed on the side portion in a radial direction of said flowing-in conduit 32 and said flowing-out conduit 34 while communicating with them and reference numeral 36 designates a valve seat formed on an end portion of the flowing-out conduit 34 with facing to said valve chamber 35.

Reference numeral 37 designates an inner cylinder made of a nonmagnetic material mounted on the passage block 31 at an end portion thereof. Reference numeral 38 designates a movable core made of a magnetic material, such as iron, slidably inserted into said inner cylinder 37 and said movable core 38 is inserted into the valve chamber 35 at an end portion thereof. Reference numeral 39 designates a valve body provided on an end face of the movable core 38 and reference numeral 40 designates a plate spring mounted on the movable core 38 at an end portion thereof and fixedly mounted on the passage block 31 at the other end thereof for supporting the movable core 38.

Reference numeral 41 designates a fixed core opposite to the movable core 38 and fixedly mounted on the inner cylinder 37 at a sliding gap 42. Also said fixed core 41 is made of a magnetic material. Reference numeral 43 designates a coil provided on an outer circumference of the inner cylinder 37 for magnetizing the fixed core 41 and reference numeral 44 designates an outer cylinder.

In this flow rate control valve, the flowing-in conduit 32 is supplied with a fluid such as gas. In order to flow said fluid from the flowing-in conduit 32 to the flowing-out conduit 34, a voltage is applied to said coil 43. Thereupon, the fixed coil 41 is magnetized to draw the movable core 38 against a force of said plate spring 40, whereby separating said valve body 39 from said valve seat 36 to open the valve seat 36, and thus the fluid flows into the flowing-out conduit 34 from the flowing-in conduit 32 through the valve chamber 35.

A flow rate of the fluid flowing in the above described manner is controlled by changing said voltage applied to the coil 43 to change a magnetic force of the fixed core 41, whereby changing a sliding quantity of the movable core 38 to change an interval between the valve seat 36 and the valve body 39.

In the above described conventional flow rate control valve, the valve chamber 35 and the inner cylinder 37 are positioned on the side portion of a flowing course of fluid, so that they provide a considerable dead space.

Moreover, when the fluid is flown from the flowing-in conduit 32 to the flowing-out conduit 34, an attraction of the flowing fluid acting upon the fluid flowing into the valve chamber 35 and the inner cylinder 37 is reduced on account of the above described construction, so that the fluid flows slowly and difficultly within the valve chamber 35 and the inner cylinder 37, whereby a problem occurs in that the displacement is slowed down or deteriorated.

For example, in the case where the flowing gas is a sample gas of which components are to be measured, a problem has further occurred in that an analytical accuracy is deteriorated because of a gas of which displacement is slowed down or made difficult.

SUMMARY OF THE INVENTION

The present invention solves the above described problems and it is an object of the present invention to provide a flow rate control valve capable of smoothly flowing a total quantity of fluid, such as gas and liquid, while reducing a dead space and without staying a part of said fluid.

A flow rate control valve comprising a fixed core made of a magnetic material provided with a coil arranged on a circumference thereof, a movable core and a valve body made of a magnetic material moved of an attraction by a magnetic force of said fixed core or a release from said magnetic force to open and close a valve seat and a movable member composed of a supporting spring according to the present invention is characterized in that the fixed core is provided with a passage passing through an opening formed in a surface opposite to said movable member and the movable member is provided with a passage guiding a fluid.

It is suitable for a smooth flowing of fluid that said passage of the movable member is formed as an opening in said movable core in correspondence to a sectional area and the like of said passage of the fixed core.

A position of said valve seat arranged is selected in correspondence to a type, that is a normal close type or a normal open type. For example, in said normal close type the valve seat is arranged on the upstream side of said valve body while in said normal open type the valve seat is arranged at an end portion and the like of the fixed core positioned on the downstream side of the valve body.

And, the passage of the movable member can be optionally constructed, for example it may be formed as a hole passing through said supporting spring and the movable core or a hole is formed in the supporting spring and the fluid, which has passed through said hole, is flown around an outer circumference of the movable core to be introduced into the passage of the fixed core.

In this flow rate control valve, the valve seat is opened or closed by applying a voltage to said coil to magnetize the fixed core, whereby moving the movable member by the magnetic force of the fixed core or cutting off said voltage applied to the coil to release the movable member from the magnetic force, whereby moving the movable member by a force of the supporting spring. A flow rate of the flowing fluid is controlled by changing the voltage applied to the coil to change an interval between the valve seat and the valve body.

And, the fluid, such as gas, is passed through the passage of the movable member and then the passage of the fixed core to be flown out. Since the fixed core is provided with the passage passing therethrough to make a flowing course of the fluid nearly identical with an arrangement of the movable member and the fixed core in such a manner, that said dead space is reduced. Moreover, since an attraction of the fluid passing through the passage of the fixed core acts almost all over the upstream side of the fixed core, a part of the fluid is hardly stayed and thus the total quantity of fluid smoothly flows.

BRIEF DESCRIPTION OF THE DRAWINGS

A first preferred embodiment of the present invention is shown in FIGS. 1 to 4, in which.

DETAILED DESCRIPTION OF THE PREFERRED EMBODIMENTS

Figure 1:
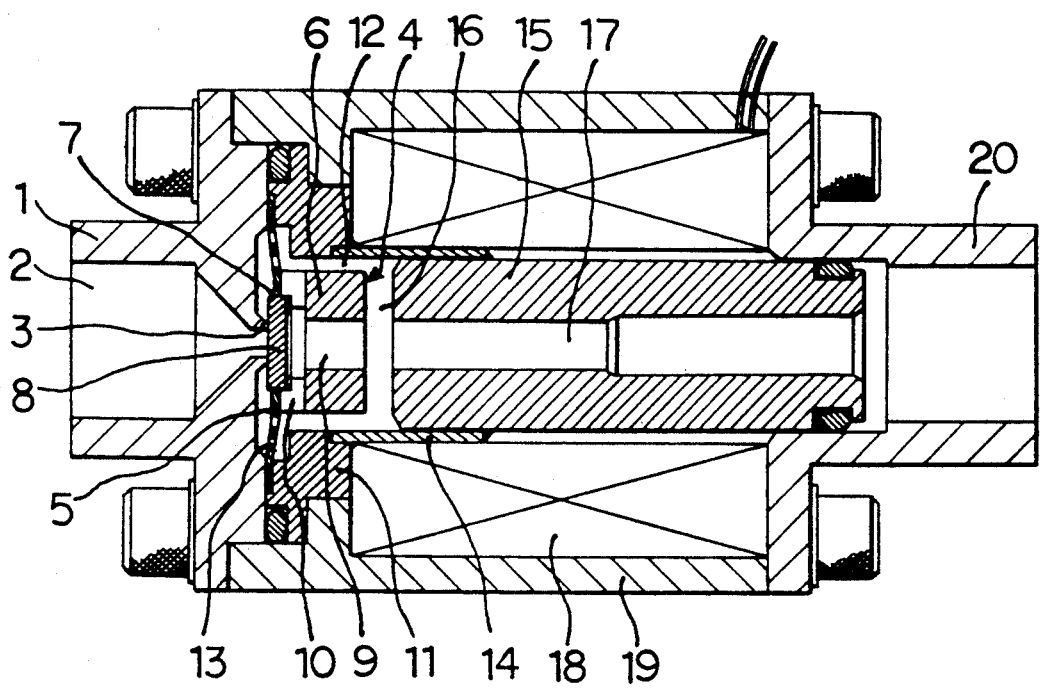
FIG. 1 is a sectional front view.
Figure 2:
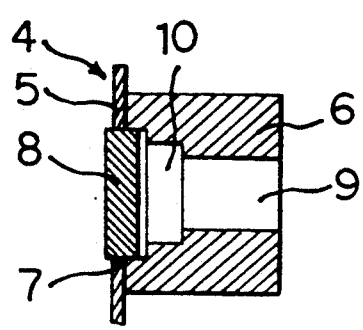
FIG. 2 is a sectional plan view showing a movable member portion.

Said first preferred embodiment of a flow rate control valve according to the present invention will be below described with reference to a normal close-type one for use in gas shown in FIGS. 1 to 4.

Referring to FIGS. 1 to 4, reference numeral 1 designates a flowing-in conduit provided with a gas passage 2 passing therethrough and said flowing-in conduit 2 is provided with a valve seat 3 formed at an end portion thereof. Reference numeral 4 designates a movable member comprising a movable core 6 made of a magnetic material, such as polar stainless steel, fixedly mounted on one side surface of a plate spring 5 as a supporting spring by welding and the like and a valve body 8 made of rubber, plastics, metals or the like fixedly inserted into a hole 7 formed in a central portion of said plate spring 5.

Said movable core 6 is provided with a through hole 9 as a passage of said movable member 4 and said concave groove 10 is made deeper than a thickness of said valve body 8 in a radial direction thereof in an end portion of the movable core 6 so that a gas may flow through said through hole 9.

And, the movable member 4 is fixedly mounted on said flowing-in member 1 by engaging the valve body 8 with said valve seat 3 and putting an outer circumferential portion of the plate spring 5 between the flowing-in member 1 and a ring fixture member 11. Reference numeral 12 designates a gas-flowing gap formed between an outer circumferential surface of the movable core 6 and an inner circumferential surface of said fixture member 11.

Figure 4:
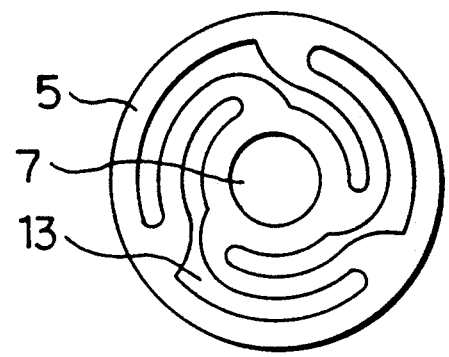
FIG. 4 is a front view showing a plate spring.

The plate spring 5 is provided with a plurality of long holes 13 longer in their circumferential direction in a circumferential portion of said hole 7, as shown in FIG. 4, in order to make an elastic deformation thereof in a direction of thickness thereof smooth.

Reference numeral 14 designates an inner cylinder made of a nonmagnetic material fixedly standing at an end portion of the fixture member 11 and reference numeral 15 designates a fixed core made of a magnetic material, such as polar stainless steel, inserted into said inner cylinder 14 at an end portion thereof and fixedly mounted on the inner cylinder 14 at a sliding interval 16 from the movable core 6. Reference numeral 17 designates a passage passing through the through hole 9 formed in an almost same size as the through hole 9. Reference numeral 18 designates a coil arranged around the inner cylinder 14 and said fixed core 15, reference numeral 19 designating an outer cylinder, and reference numeral 20 designating a pipe-like flowing-out member arranged with communicating with said passage 17.

This flow rate control valve has the above described construction and said gas is supplied in the flowing-in conduit 2 of the flowing-in member 1. Usually the valve seat 3 is closed by means of the valve body 8.

In order to flow the gas, a voltage is applied to said coil 18 to magnetize the fixed core 15. Thereupon, the movable core 6 is drawn by a magnetic force of the fixed core 15 against an elasticity of the plate spring 5 to be moved, whereby separating the valve body 8 from the valve seat 3 and thus opening the valve seat 3, so that the gas supplied in the flowing-in conduit 2 passes through said long holes 13 of the plate spring 5, the concave groove 10, the through hole 9 and said gas-flowing gap 12 and then said passage 17 of the fixed core 15 from the valve seat 3 to be flown out through said flowing-out member 20.

A quantity of the flowing gas is controlled by changing said voltage applied to said coil 18 to change said magnetic force of the fixed core 15, whereby changing a quantity of the movable core 6 moved and thus changing an interval between the valve body 8 and the valve seat 3.

Since the gas passes through the through hole 9 and the gas-flowing gap 12 and then flows into the passage 17 in the above described manner and this flowing course of gas nearly coincides with an arrangement of the valve seat 3, the valve body 8, the movable core 6 and the fixed core 15, a dead space is remarkably reduced. Moreover, the attraction of the gas flowing through the passage 17 acts upon the through hole 9 and the gas-flowing gap 12, so that the total quantity of gas can be smoothly flown and thus a part of gas can be almost prevented from staying.

In this preferred embodiment, the through hole 9 of the movable core 6 and the passage 17 of the fixed core 15 are formed in the almost same size, so that the gas, which has passed through the through hole 9, is smoothly flown into the passage 17 and thus the flowing gas can be more speedily replaced.

And, if the movable core 6 and the fixed core 15 are made of polar stainless steel, as in the flow rate control valve according to this preferred embodiment, there is a lesser possibility that the movable core 6 and the fixed core 15 are corroded even though the flowing gas is corrosive and thus not only the movable core 6 and the fixed core 15 can be used for a long time but also a problem of contamination of the gas on account of a corrosion of the movable core 6 and the fixed core 15 can be prevented.

Besides, since the gas-flowing gap 12 is formed on the outer circumference of the movable core 6 so that the movable core 6 may not be brought into contact with the fixed member 11 and an inner surface of the inner cylinder 14, there is not the possibility that particles are generated even though the movable core 6 is repeatedly slid and thus the gas is not contaminated with particles.

Accordingly, if this flow rate control valve is applied to for example a mass flow controller, the total quantity of gas can be smoothly flown, whereby providing a mass flow controller not only capable of speedily replacing the gas but also having no possibility of contamination.

Figure 3:
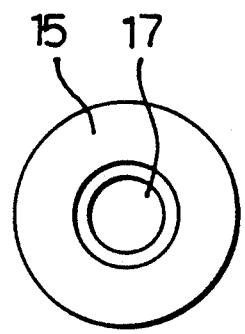
FIG. 3 is a right side view showing a fixed core.

In addition, although the movable core 6 is provided with the through hole 9 and the gas-flowing gap 12 is arranged on an outer circumference of the movable core 6 in order to flow a fluid, such as the gas, in this preferred embodiment, merely any one of the through hole 9 and the gas-flowing gap 12 may be provided so far as the gas can be flown. And, although the passage 17 is formed at a central portion of the fixed core 15 in the form of a hole having a circular section, as shown in FIG. 3, this sectional form may be optional, for example square, and it may be provided eccentrically relative to the fixed core 15. This is similar also as for the through hole 9 of the movable core 6.

Figure 5:
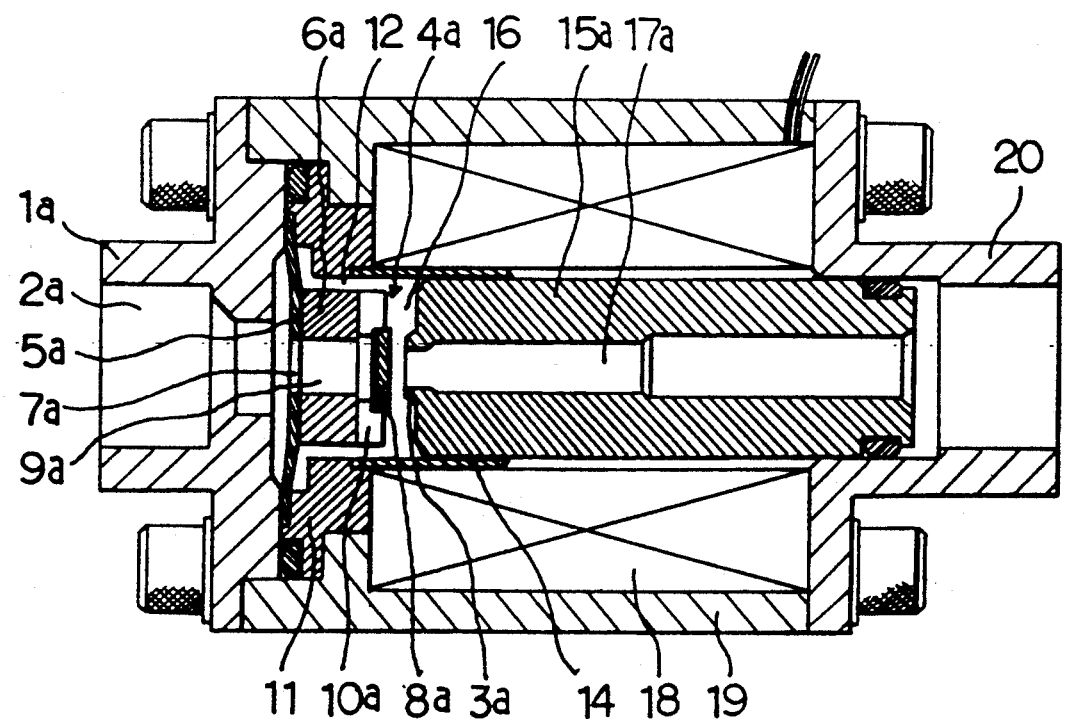
FIG. 5 is a sectional front view showing a second preferred embodiment.
Figure 6:
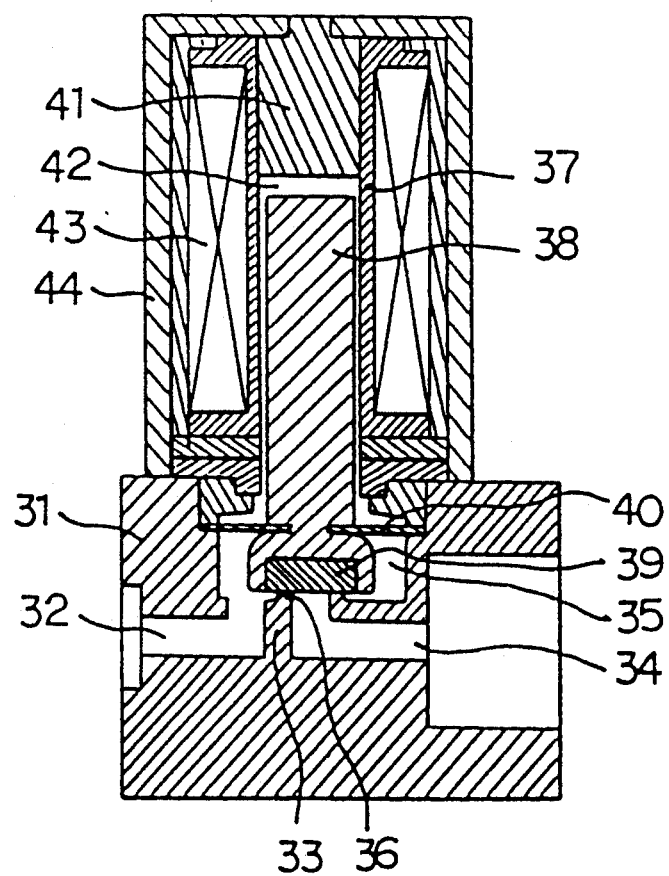
FIG. 6 is a sectional front view showing the conventional example.

FIG. 5 shows a second preferred embodiment of the flow rate control valve of a normal open type according to the present invention.

Referring to FIG. 5, reference numeral 1a designates a flowing-in member provided with a gas flowing-in conduit 2a passing therethrough. Reference numeral 4a designates a movable member comprising a movable core 6a made of a magnetic material, such as polar stainless steel, fixedly mounted on one side surface of a plate spring 5a as a supporting spring by welding and the like and a valve body 8a mounted on an end portion of said movable core 6a on a side opposite to said flowing-in conduit 1a.

Said movable core 6a is provided with a through hole 9a as a passage and a concave groove 10a and said concave groove 10a is made deeper than a thickness of said valve body 8a in a radial direction thereof in an end portion of the movable core 6a. In addition, said plate spring 5a is provided with a hole 7a so as to overlap said through hole 9a.

And, a pipe-like fixed core 15a made of a magnetic material, such as polar stainless steel, and provided with a passage 17a passing therethrough is provided with a valve seat 3a, which is opened and closed by means of said valve body 8a, projected on an end portion thereof opposite to the valve body 8a so as to communicate with said passage 17a and the valve seat 3a and the valve body 8a are arranged at an interval between them.

Other constructions are the same as in the above described first preferred embodiment, so that they are designated by the same reference numerals as in the first preferred embodiment and their detailed description is omitted.

In this flow rate control valve, the gas is supplied into the flowing-in conduit 2a of the flowing-in member 1a and usually the valve body 8a is separated from the valve seat 3a to open the valve seat 3a. The gas supplied into the flowing-in conduit 2a passes through said hole 7a, the through hole 9a, the concave groove 10a, the valve seat 3a and the passage 17a to be flown out.

And, a flow rate of the gas is controlled by applying a voltage to the coil 18 to magnetize the fixed core 15a, whereby drawing the movable core 6a by a magnetic force of the fixed core 15a and thus changing an interval between the valve seat 3a and the valve body 8a. The gas is cut off by applying a voltage to the coil 18 to draw the movable core 6a by means of the fixed core 15a, whereby closing the valve seat 3a by means of the valve body 8a.

As obvious from this second preferred embodiment, also the flow rate control valve of a normal open type can be simply constructed by merely changing positions of the valve seat 3a and the valve body 8a.

In addition, although the case where the fluid is supplied from the side of the movable member to the side of the fixed core was shown in the above described preferred embodiment, the reverse is also satisfactory.

In the flow rate control valve according to the present invention, the fixed core is provided with the flowing conduit passing through the surface opposite to the movable member thereof and the movable member is provided with the passage through which the fluid is guided.

Accordingly, the flowing course of the fluid is nearly identical with the arrangement of the movable member and the fixed core, so that the dead space is reduced. Moreover, since an attraction of the fluid passing through the flowing conduit of the fixed core acts almost all over the upstream side of the fixed core, the total quantity of fluid can be always smoothly flown without staying a part thereof in the passage of the movable member and the like, whereby the fluid can be speedily replaced.

What is claimed is:

1. A flow rate control valve having a housing and a coil arranged within the housing and capable of generating an electro-magnetic force when energized comprising:

an elongated core member of a magnetic material having a central passageway, extending along a longitudinal axis, is fixedly mounted within the housing, the central passageway having a valve seat extending around an aperture opening of the central passageway at one end of the core member;

a valve core member of a magnetic material has a passageway aligned with the longitudinal axis of the core member passageway, one end of the valve core member has a concave groove extending radially outward from the passageway;

a solid valve body is fixedly mounted on the valve core member and extends traversely across and offset from the valve core member concave groove, whereby fluid flow can pass around the valve body through the concave groove when it is in an open condition, and means for resiliently mounting the valve core member for movement along the longitudinal axis when subject to an electro-magnetic force, whereby dead space is minimized with improved fluid flow through the control valve.

2. The flow rate control valve of claim 1 wherein the means for resiliently mounting the valve core member consists of a flexible plate spring attached at the opposite end of the valve core member from the valve body.

3. A flow rate control valve having a housing and a coil arranged within the housing and capable of generating an electro-magnetic force when energized comprising:

an elongated core member of a magnetic material having a central passageway, extending along a longitudinal axis, is fixedly mounted within the housing, the central passageway having a valve seat extending around an aperture opening of the central passageway at one end of the core member;

a valve assembly sealed at one end of the housing including:

an annular fixture member mounting the core member in the housing;

a valve core member of a magnetic material has a passageway aligned with the longitudinal axis of the core member passageway, one end of the valve core member has a concave groove extending radially outward from the passageway;

a solid valve body is fixedly mounted on the valve core member and extends traversely across and offset from the valve core member concave groove, whereby fluid flow can pass around the valve body through the concave groove when it is in an open condition;

a flexible spring attached at the opposite end of the valve core member from the valve body, and a mounting cylindrical member surrounding one end of the elongated core member and seated at the other end against the annular fixture member, whereby dead space is minimized with improved fluid flow through the control valve.

4. An flow rate control valve having a housing, a pair of end caps, fasteners for securing the end caps to the housing, and a coil member arranged within the housing and capable of generating an electro-magnetic force when energized, the improvement consisting of:

an elongated core member of a magnetic material having a central passageway, extending along a longitudinal axis, is fixedly mounted within the housing, the central passageway having a valve seat extending around an aperture opening of the central passageway at one end of the core member;

a valve assembly sealed at one end of the housing including:

an annular fixture member mounting the core member in the housing;

a valve core member of a magnetic material has a passageway aligned with the longitudinal axis of the core member passageway, one end of the valve core member has a concave groove extending radially outward from the passageway;

a solid valve body is fixedly mounted on the valve core member and extends traversely across and offset from the valve core member concave groove, whereby fluid flow can pass around the valve body through the concave groove when it is in an open condition;

a flexible spring attached at the opposite end of the valve core member from the valve body, and a mounting cylindrical member surrounding one end of the elongated core member and seated at the other end against the annular fixture member, whereby dead space is minimized with improved fluid flow through the control valve.

* * * * *